(12) United States Patent
Wettstein

(10) Patent No.: US 7,346,214 B2
(45) Date of Patent: Mar. 18, 2008

(54) METHOD FOR CAPTURING A COMPLETE DATA SET OF FORMS PROVIDED WITH GRAPHIC CHARACTERS

(76) Inventor: Mathias Wettstein, Heinrichstr. 1, 40699 Erkrath (DE)

( * ) Notice: Subject to any disclaimer, the term of this patent is extended or adjusted under 35 U.S.C. 154(b) by 997 days.

(21) Appl. No.: 10/249,628

(22) Filed: Apr. 25, 2003

(65) Prior Publication Data

US 2003/0226117 A1     Dec. 4, 2003

Related U.S. Application Data

(63) Continuation of application No. PCT/EP01/12447, filed on Oct. 26, 2001, now abandoned.

(30) Foreign Application Priority Data

Oct. 26, 2000  (EP) ................................ 00123191

(51) Int. Cl.
   *G06K 9/00*     (2006.01)
(52) U.S. Cl. ..................... 382/187; 370/320; 375/343
(58) Field of Classification Search ................ 382/187; 370/342, 320, 335; 375/152, 326, 130, 343; 365/189.05, 185.22, 185.17, 185.12, 201, 365/194, 185.18; 714/721, 718; 368/10; 340/991, 990; 342/457; 455/231, 343.2
   See application file for complete search history.

(56) References Cited

U.S. PATENT DOCUMENTS

| | | | |
|---|---|---|---|
| 5,040,226 A | 8/1991 | Elischer et al. ................. | 382/7 |
| 5,191,525 A * | 3/1993 | LeBrun et al. ............... | 715/500 |
| 5,193,121 A | 3/1993 | Elischer et al. ................. | 382/7 |
| 5,235,654 A * | 8/1993 | Anderson et al. ........... | 382/180 |
| 5,305,396 A * | 4/1994 | Betts et al. .................. | 382/175 |
| 5,511,135 A | 4/1996 | Rhyne et al. ................ | 382/187 |
| 5,615,284 A | 3/1997 | Rhyne et al. ................ | 382/187 |
| 6,043,819 A * | 3/2000 | LeBrun et al. ............... | 345/418 |

FOREIGN PATENT DOCUMENTS

HU        196 008      2/1988

\* cited by examiner

*Primary Examiner*—Sheela Chawan
(74) *Attorney, Agent, or Firm*—Gudrun E. Huckett

(57) ABSTRACT

In a method for capturing a complete data set of forms of identical layout provided with graphic characters in separate data fields, an image of the form is produced and image data are saved. Aided by a character recognition program, the characters of the data fields are identified as much as possible according to a predetermined degree of certainty. Image data of unidentified data fields are correlated with a reference parameter to generate a transfer data set that is sent to an external evaluation station where the characters of the unidentified data field are identified based on image data of the transfer data set. The identified characters are combined to a character data set and compiled with the reference parameter to a processed transfer data set and returned. Based on the reference parameter, the character data set is correlated with the other data fields to generate a complete data set.

5 Claims, 1 Drawing Sheet

METHOD FOR CAPTURING A COMPLETE DATA SET OF FORMS PROVIDED WITH GRAPHIC CHARACTERS

CROSS REFERENCE TO RELATED APPLICATIONS

This is a continuation of International Application PCT/EP01/12447 with an international filing date of Oct. 26, 2001, not published in English under PCT Article 21(2), and now abandoned.

BACKGROUND OF INVENTION

The invention relates to a method for capturing a complete data set of forms provided with graphic characters, wherein the form layout contains several separate data fields whose spatial position within the form layout is identical for all forms, having the following steps.
  Producing an image of the form and saving the image data of the individual data fields.
  Based on the image data of the data fields and with the aid of a character recognition program, identifying the graphic characters contained in the data fields inasmuch as they are identifiable with a predetermined degree of certainty.
  Determining the unidentified data fields, i.e., those data fields of the form whose graphic characters could not be identified at all or could not be identified with the predetermined degree of certainty.
  Transferring information in regard to the data fields to an external evaluation station, preferably by means of a global data net.
  In the external evaluation station, identifying completely the graphic characters of the unidentified data field based on the information in regard to the data fields.
  Transferring the graphic character identifications carried out in the evaluation station for further use.

When processing documents and, in particular, forms, there is often the task of translating a manually written word or graphic character into computer language. For this purpose, the document in question is converted by means of a scanner into electronic images in the form of image data. By means of a suitable image recognition software, it is then attempted to translate this image data into computer characters in order to determine, based on the computer characters, the contents of the written words or graphic characters. The reliability of the capture of graphic characters depends greatly on the quality of writing as well as the image quality of the document to be captured. A primary parameter affecting this is the quality of the writing, for example, the quality of lettering done by hand, but also of a machine-generated writing produced by a typewriter. Also having an effect is the image sharpness, i.e., the separation between the individual graphic characters and the usually light-colored image background; moreover, the translation quality of the levels of greyscale into black/white and also a possible soiling of the document. All of these factors can have an impact in regard to whether the character recognition program recognizes the graphic character or not. A progression of non-recognition is a faulty recognition. Based on a supposedly recognized graphic character, a nonsense graphic character is interpreted.

In connection with the voluminous capture of handwritten forms, as it is, for example, typical for processing medical prescription forms, as a result of graphic characters that are not recognized at all or are wrongly recognized, considerable expenditures are incurred for after processing, i.e., manual capture of those forms that cannot be recognized or recognized only incompletely by means of a character recognition program. This concerns primarily also forms which are filled out in non-segmented writing, i.e., cursive handwriting.

A method with the method steps set forth above is known from U.S. Pat. No. 5,305,396. It concerns a correction method for recognizing written forms wherein letters or graphic characters which are not recognized or recognized with uncertainty are determined in several steps iteratively. This can be carried out in particular also at a spatially removed evaluation station, for example, by using the global data net. First, the individual image data of the form are saved in accordance with the data fields of the form. Based on the image data by means of a character recognition program, identification of the graphic character is performed inasmuch as such identification is possible with satisfactory certainty. The coordinates of characters which are not recognized or not recognized with sufficient certainty are then recorded in a machine-generated data structure (MGDS). The data of the MGDS are then transmitted to an external evaluation station. Here, the graphic characters are completely identified, and the MGDS is supplemented by the corresponding repair information. In the method according to U.S. Pat. No. 5,305,396, a single complex data structure is used which accumulates the "repair history" for all concerned fields, respectively, which is made available at the end of evaluation. Such a method is unsatisfactory with respect to data privacy because the confidentiality of the information contained in the forms is not ensured, in particular, because access to the entire complex data structure is possible.

SUMMARY OF INVENTION

It is therefore an object of the invention to provide a method with which an inexpensive after processing of forms which have not been sufficiently identified in regard to their contents by means of a character recognition program is made possible, wherein, in the context of after processing, the confidentiality of the information contained in the forms is to be ensured.

For solving this object, a method of the aforementioned kind is proposed which is characterized by the following steps.
  For each unidentified data field, correlating its image data with a reference parameter assigned to this data field to generate a transfer data set to be processed.
  In the external evaluation station, identifying the graphic characters of the unidentified data field based on the image data of the transfer data set.
  In the external evaluation station, combining the identified graphic characters to a graphic character data set and compiling them with the reference parameter of the corresponding data field to a processed transfer data set which is returned.
  Based on the reference parameter of the returned transfer data set, correlating the graphic character data set with the other data fields of the same form to generate the complete data set.

Preferably, the image data are saved as black/white image data as well as contrast values, wherein the image date contained in the transfer data set to be processed are contrast value image data. Preferably, the image data processed by the character recognition program are black/white image data.

The method according to the invention is characterized by a minimal expenditure for the after processing of those forms whose writing cannot be identified or only insufficiently identified by means of a computer-aided character recognition program. For this purpose, according to the invention in the case of forms whose graphic characters cannot be identified at all or cannot be identified to the predetermined degree of certainty, a separation is carried out in data fields whose contents has already been recognized, on one hand, and data fields whose contents has not yet been recognized, on the other hand. The previously saved image data of those data fields whose contents could not yet be recognized, are combined with a reference parameter assigned to this data field to generate a transfer data set. Only this transfer data set is then transferred to an external evaluation station where by visual comparison performed by a person the complete identification of the data field, which has not been identified up to this point, is carried out, in particular, based on the image data of the concerned data field contained in the transmitted transfer data set. Subsequently, the thus produced graphic character data set is returned together with the reference parameter as a now complete transfer data set wherein for this return transfer as well as for the prior transfer to the external evaluation station the information avenues of the global data net, in particular, the Internet, can be used.

In the method according to the invention, a complete after processing of all forms that cannot be machine-identified is therefore replaced by after processing exclusively individual data fields. This result in a significantly reduced personnel expenditure and thus also reduced financial expenditure for after processing. A further advantage resides in that during after processing the respective person must only check individual data fields and identify them with respect to their graphic characters. A correlation to other data fields of the same form is not possible for the person carrying out after processing so that the highest degree of confidentiality of the information contained on the forms is ensured. This is particularly important when capturing prescription forms with the patient-related data contained thereon.

DETAILED DESCRIPTION

Figure 1:
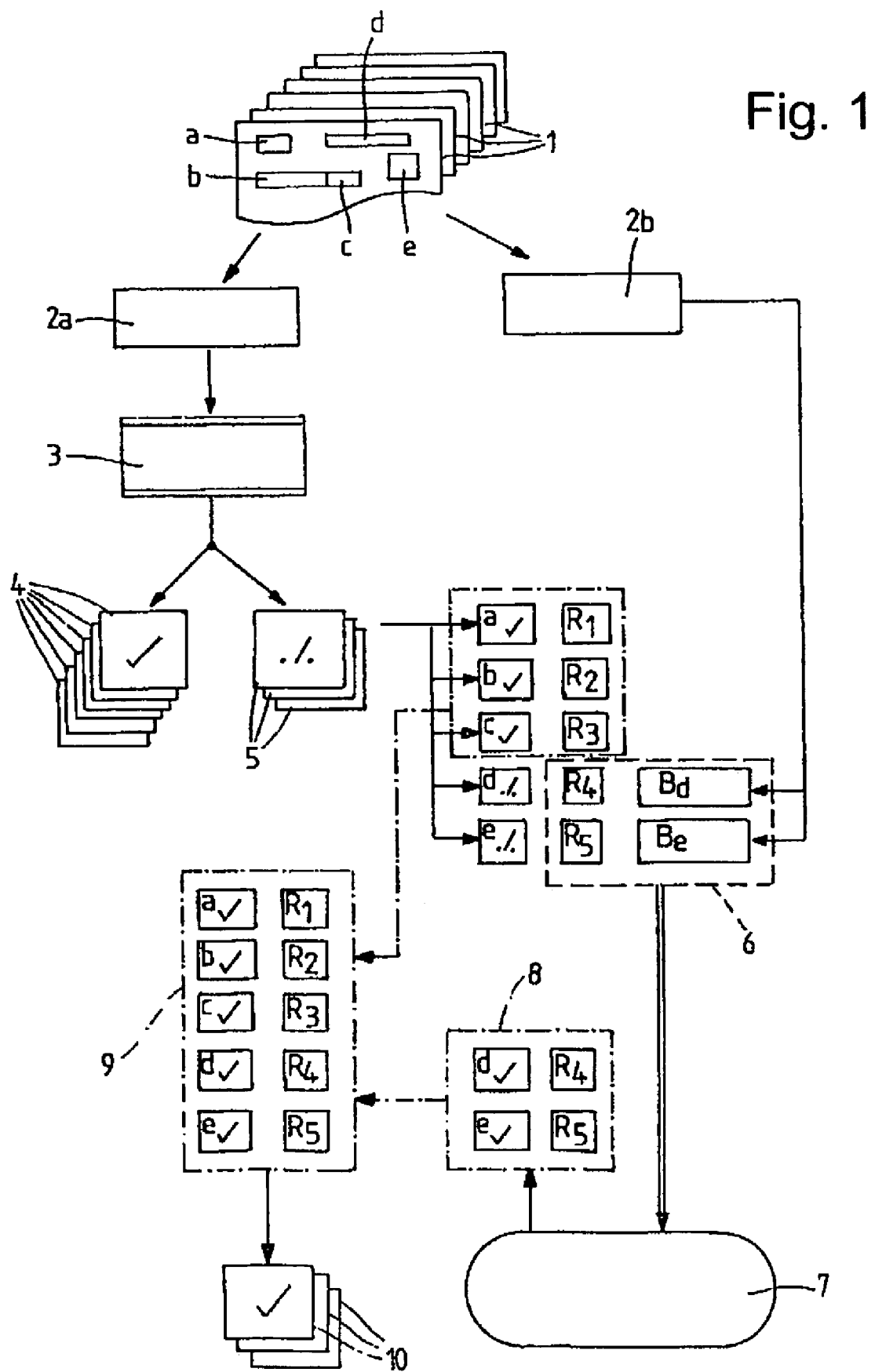
FIG. 1 shows schematically a method for capturing the complete data set of forms provided with graphic characters.

The forms 1, which can be, for example, prescription forms with hand-written medical prescriptions, have several data fields a, b, c, d, e. The spatial position of these data fields within the form layout is identical for all forms 1. The data fields a, b, c, d, e can be filled in with, for example, a medical prescription, the name of the patient, an identification number for identifying the health insurance carrier, etc.

The writing on such forms 1, for example, by the physician treating the patient, is generally not carried out by typewriter or by way of other standardized lettering, but by hand. This circumstance requires, if the data fields a, b, c, d, e are to be machine-readable, the use of a corresponding intelligent character recognition program. For capturing the contents of the data fields of the individual forms, they are first individually imaged by means of an image recognition device, and the images generated in this way are stored. This is done by a conventional scanner. It is important in this connection that image processing is divided into black/white imaging 2a and imaging based on individual contrast values 2b, for example, levels of greyscale or multi-level color values which can even be filtered electronically according to resultant color shift during subsequent evaluation.

The image data of the respective form which has been produced by black/white scanning 2a is then evaluated by means of a character recognition program 3 (in English: ICR, intelligent character recognition). In most cases, i.e., for the preponderant number of forms 1, the character recognition program 3 will be able to recognize the graphic characters on all data fields a, b, c, d, e so that, subsequently, the evaluation of these data can be carried out. Subsequent to this, in the preponderance of cases, completely recognized data sets 4 are present accordingly.

However, by means of the character recognition program 3, not all forms can be read completely in a gap-free way. There is a residual amount of the data sets 5 which are not recognized or not completely recognized. There can be multiple reasons for this lack of recognition of data fields of individual forms. For example, the writing used by the person filling out the form can be unreadable; the writing can be smudged; the writing is not at the required position within the form layout; or the form itself can be simply soiled within the area of individual data fields or soiled overall. In all cases of unrecognized or incompletely recognized data sets 5, after processing of the corresponding forms must be carried out. For this purpose, in the next step a determination of the unidentified data fields d, e to be separate from the already identified data fields a, b, c of the respective data set is carried out. Unidentifiable data fields are defined as those data fields whose graphic characters cannot be recognized or cannot be recognized according to the system-internal predetermined degree of certainty by the character recognition program 3. The image data $B_d$, $B_e$ of these not yet identified data fields d, e are combined together with reference parameters $R_4$, $R_5$ assigned to these data fields d, e to generate a transfer data set 6 to be processed.

The assignment of reference parameters $R_4$, $R_5$ of the transfer data set 6 is carried out by means of an encrypting principle in order to ensure that for an external person, no conclusion in regard to the owner or reference person of this data is possible based on the correlation of the image data $B_d$, $B_e$ with the corresponding reference parameters $R_4$, $R_5$. In this way, a greatest possible data safety is achieved because the transfer data set 6 by itself has only minimal significance.

The transfer data set 6 to be processed is retrieved by data exchange from an external evaluation station 7 via the Internet or another global data net. The external evaluation station 7 is, for example, an external service provider which, on behalf of the operator of the method, carries out after processing services for payment. Based on the image data $B_d$, $B_e$ of the transfer data set 6, in the external evaluation station a person experienced in recognizing graphic characters will check the image data set, i.e., the image of the data field which has not yet been captured, with the result that in most cases the graphic characters contained therein can be identified. In order to facilitate this identification, the image data $B_d$, $B_e$ of the transfer data set 6 are based on the data of the greyscale imaging 2b. It was found that graphic characters which are difficult to read can be identified better based on facsimile images in levels of greyscale in comparison to a black/white image. Instead of the greyscale levels, it is also possible to use color values. The color values can be, for example, electronically filtered in order to suppress in this way, for example, colored background structures with regard to evaluation.

The data fields d, e which have been identified based on the greyscale image data in the external data evaluation station 7, are returned as a graphic character data set together with the correlated reference parameters $R_4$, $R_5$ as a processed transfer data set 8, wherein this return transfer is also carried out by the data lines of the Internet or other global data net.

The information of the processed transfer data set 8 are then combined with the already completely captured information of the data fields a, b, c to a complete set of data fields a, b, c, d, e. The drawing shows the compilation of the data fields at reference numeral 9. Ordering criteria for the compilation are the reference parameters correlated with the data fields, respectively, wherein not only the previously unidentified data fields d, e but also the already recognized data fields a, b, c, recognized by the character recognition program 3, have an assigned individual reference parameter $R_4$, $R_5$ or $R_1$, $R_2$, $R_3$, respectively. In the end, a completely recognized data set 10 is present which can then be used for further evaluation.

While specific embodiments of the invention have been shown and described in detail to illustrate the inventive principles, it will be understood that the invention may be embodied otherwise without departing from such principles.

What is claimed is:

1. A method for capturing a complete data set of forms provided with graphic characters, wherein the form layout of the forms contains several separate data fields (a, b, c, d, e), wherein a spatial position of the separate data fields within the form layout is identical for all of the forms (1), the method comprising the following steps:

a) producing an image of a form (1) and saving the image data of the individual data fields (a, b, c, d, e);

b) based on the image data of the data fields, aided by a character recognition program (3), identifying the graphic characters contained in the data fields (a, b, c, d, e) inasmuch as the graphic characters are identifiable with a predetermined degree of certainty;

c) determining unidentified data fields (d, e) of the form (1) where graphic characters could not be identified at all or could not be identified with the predetermined degree of certainty;

d) separating the image data of the unidentified data fields from the image date of identified data fields, and, for each unidentified data field (d, e), correlating image data ($B_d$, $B_e$) of each unidentified data field with a reference parameter ($R_4$, $R_5$) assigned to the data field (d, e) to generate a transfer data set (6) to be processed of the image data with the correlated reference parameter of one or more unidentified fields;

e) transferring only the transfer data set (6) to be processed to an external evaluation station (7);

f) in the external evaluation station (7), identifying the graphic characters of the unidentified data field (d, e) based on the image data ($B_d$, $B_e$) of the transfer data set;

g) in the external evaluation station (7), combining the identified graphic characters to a graphic character data set and compiling the identified graphic characters with the reference parameter ($R_4$, $R_5$) of the corresponding data field (d, e) to a processed transfer data set (8) and returning the processed transfer data set (8);

h) based on the reference parameter ($R_4$, $R_5$) of the returned processed transfer data set (8), correlating the graphic character data set with the other data fields of the same form to generate the complete data set (10).

2. The method according to claim 1, wherein black/white image data and contrast values are saved as image data and the image data contained in the transfer data set (6) to be processed are contrast value image data.

3. The method according to claim 1, wherein the image data processed by the character recognition program (3) are black/white image data.

4. The method according to claim 1, wherein in the step e) transfer is carried out via a global data net.

5. The method according to claim 1, wherein in the step g) return of the processed transfer data set (8) is carried out via a global data net.

* * * * *